(12) United States Patent
Bianchi

(10) Patent No.: US 6,973,881 B2
(45) Date of Patent: Dec. 13, 2005

(54) RAILCAR NAILABLE FLOOR

(76) Inventor: Tamo P. Bianchi, 2055 Goldfinch Court, Oakville, Ontario (CA) L6H 3Z5

( * ) Notice: Subject to any disclaimer, the term of this patent is extended or adjusted under 35 U.S.C. 154(b) by 0 days.

(21) Appl. No.: 10/238,497

(22) Filed: Sep. 10, 2002

(65) Prior Publication Data

US 2004/0045476 A1    Mar. 11, 2004

(51) Int. Cl.$^7$ .................................................. B61D 17/00
(52) U.S. Cl. ........................................................ 105/422
(58) Field of Search .................................... 105/422, 396, 105/397, 400, 401, 409, 413, 414, 416, 417, 105/418, 419; 52/377, 578, 579, 580, 588.1, 52/630; 296/187.08, 191, 193.07

(56) References Cited

U.S. PATENT DOCUMENTS

| | | | |
|---|---|---|---|
| RE3,543 E | 7/1869 | Montgomery | |
| 313,986 A | 3/1885 | Burckhardt | |
| 397,420 A | 2/1889 | Everit | |
| 426,558 A | 4/1890 | Dithridge | |
| 793,358 A | 6/1905 | Doyle | |
| 841,221 A | 1/1907 | Becker | |
| 914,262 A | 3/1909 | Friberg | |
| 986,422 A | 3/1911 | Bettendorf | |
| 999,256 A | 8/1911 | Pulliam | |
| 1,106,110 A | 8/1914 | Pulliam | |
| 1,271,413 A | 7/1918 | Allen | |
| 1,828,842 A | 10/1931 | Loucks | |
| 2,007,354 A | 7/1935 | Vass | |
| 2,180,317 A * | 11/1939 | Davis | 52/319 |
| 2,382,761 A * | 8/1945 | Wilks | 52/506.09 |
| 2,457,129 A * | 12/1948 | Collings | 52/792.1 |
| 2,681,715 A | 6/1954 | Hansen | |
| 2,852,112 A | 9/1958 | Shay | |
| 2,900,055 A | 8/1959 | Shaver | |
| 2,955,687 A | 10/1960 | Seim | |
| 3,132,605 A * | 5/1964 | Collins | 105/422 |
| 3,184,233 A * | 5/1965 | Cook | 482/30 |
| 3,187,853 A | 6/1965 | Glaser et al. | |
| 3,216,165 A | 11/1965 | Shaver | |
| 3,221,671 A | 12/1965 | Collins | |
| 3,269,072 A | 8/1966 | Black | |
| 3,342,007 A | 9/1967 | Merson | |
| 3,362,056 A | 1/1968 | Preller et al. | |
| 3,698,224 A | 10/1972 | Sayles | |
| 3,834,105 A | 9/1974 | Powers | |
| 3,945,164 A | 3/1976 | Winsor | |
| 4,010,587 A | 3/1977 | Larsen | |
| 4,194,330 A | 3/1980 | Smith | |
| 4,224,880 A * | 9/1980 | Hogue et al. | 105/422 |
| 4,267,954 A | 5/1981 | Smith | |
| 4,460,118 A | 7/1984 | Ataka et al. | |
| 4,645,258 A | 2/1987 | Ohmura et al. | |
| 4,966,082 A | 10/1990 | Takeichi et al. | |
| 5,163,225 A | 11/1992 | Goleby | |
| 5,373,679 A | 12/1994 | Goleby | |
| 5,811,035 A * | 9/1998 | Mockry | 261/111 |
| 5,918,549 A | 7/1999 | Basile et al. | |
| 5,950,377 A * | 9/1999 | Yoder | 52/177 |
| 6,112,671 A | 9/2000 | Basile et al. | |
| 6,318,275 B1 | 11/2001 | Basile et al. | |
| 6,321,661 B1 | 11/2001 | Basile et al. | |

* cited by examiner

Primary Examiner—Mark T. Le
(74) Attorney, Agent, or Firm—Hodgson Russ LLP

(57) ABSTRACT

A nailable floor having a plurality of modular floor planks having a planar web spanning between two side flanges. The side flanges extend to bottom flanges that provide support from the underframe of a railcar. The planar web, side flanges and bottom flanges are all integrally formed from a single member.

18 Claims, 2 Drawing Sheets

RAILCAR NAILABLE FLOOR

FIELD OF INVENTION

The present invention generally relates to modular construction of a floor for vehicles and specifically to a nailable floor for railcars.

BACKGROUND OF THE INVENTION

The underframe for many railcars includes a center sill with a pair of end sills and a pair of side sills arranged in a rectangular configuration corresponding approximately with the dimensions for the floor of the freight car. Cross bearers and cross ties are often provided to establish the desired rigidity and strength for transmission of vertical loads to the center sill. A plurality of longitudinal stringers are typically provided on each side of the center sill to support the floor of the enclosed structure. Nailable metal floors are typically mounted to the underframe to provide a horizontal planar support surface for supporting the load to be carried in the freight car. The floor is nailable to provide for securing the load to prevent shifting during transport and is especially needed when the freight car is only partially loaded.

Nailable metal floors are typically comprised of several nested metal planks. This arrangement results in complex construction of the floor panels and a series of grooves in each floor panel. An example of a railway car nailable floor is disclosed in U.S. Pat. No. 4,224,880, which is incorporated herein by reference. Referring to the figure numbers of the patent, a U-shaped support member 6 is fixedly attached to the underside of the plank 2 in order to support the nailable floor from the underframe of the vehicle. What is needed is an improved design for a railcar nailable floor that reduces the cost of manufacture and reduces the weight of the floor thereby increasing the payload.

SUMMARY OF THE INVENTION

The present invention meets the above described need by providing a one-piece railcar nailable floor that reduces the costs associated with manufacturing the product and reduces the weight of the floor thereby increasing the payload.

The nailable floor comprises a plurality of modular floor planks having a planar web spanning between two side flanges. The side flanges extend to bottom flanges that provide support from the underframe of the vehicle. The planar web, side flanges and bottom flanges are all integrally formed from a single member.

BRIEF DESCRIPTION OF THE DRAWINGS

The invention is illustrated in the drawings in which like reference characters designate the same or similar parts throughout the figures of which.

DETAILED DESCRIPTION

Figure 1:
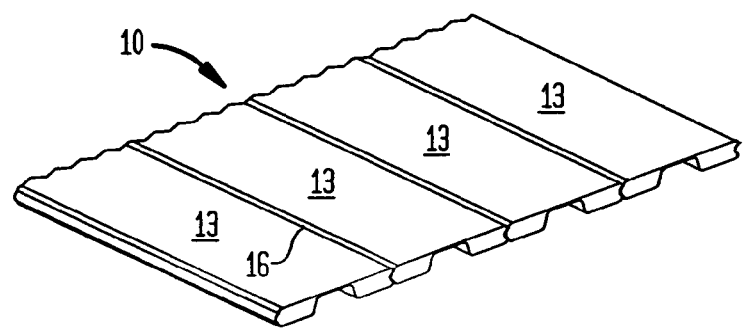
FIG. 1 is a perspective view of a nailable vehicle floor panel.

Referring to FIGS. 1–4 generally, and initially to FIG. 1, a nailable floor panel 10 comprises a plurality of parallel floor planks 13 with sufficient space therebetween to provide nailing grooves 16 at each juncture of adjacent planks. The floor panel 10 is mounted on the underframe (not shown) of a railcar. The underframe for many railcars includes a center sill with a pair of end sills and a pair of side sills arranged in a rectangular configuration corresponding approximately with the dimensions for the floor of the freight car. Cross bearers and cross ties are often provided to establish the desired rigidity and strength for transmission of vertical loads to the center sill. A plurality of longitudinal stringers are typically provided on each side of the center sill to support the floor panels disclosed in the present invention.

Figure 2:
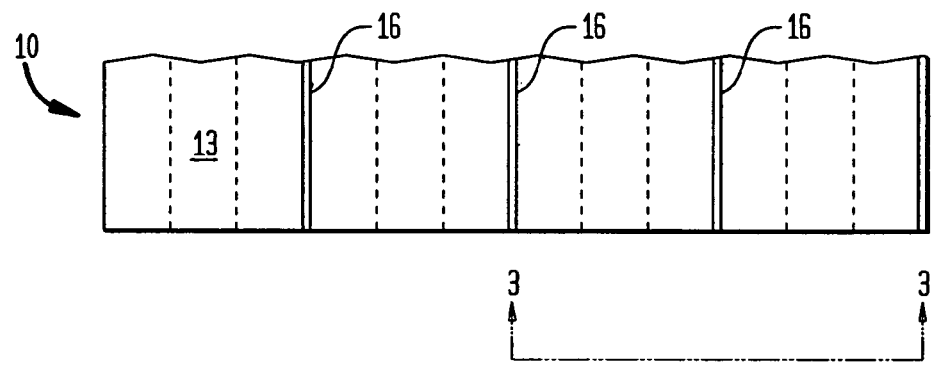
FIG. 2 is a plan view of the floor panel shown in FIG. 1.

In FIG. 2, a plan view of the floor panel 10 shows the positioning of nailing grooves 16. The nailing grooves 16 may be filled with a cement in order to help seal the interior. The individual planks 13 fit together such that a planar top surface 19 (FIG. 3) is provided. The modular nature of the design permits fabrication of the floor panel prior to installation within a railcar.

Figure 3:
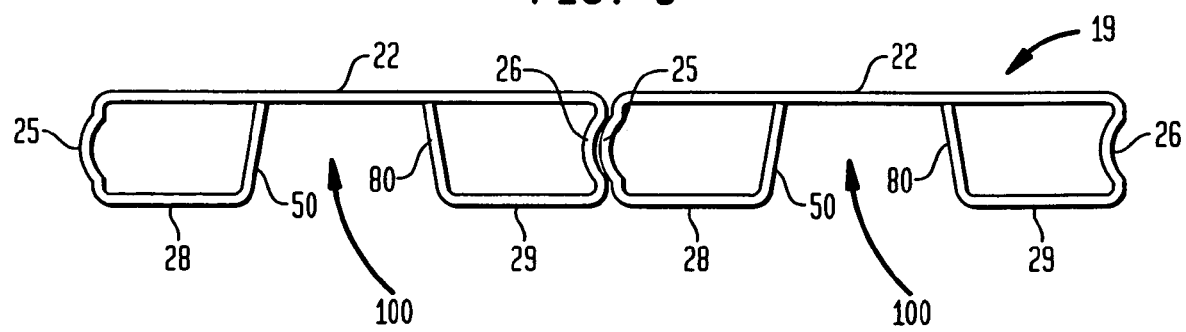
FIG. 3 is an end view taken along lines 3—3 of FIG. 2.

Turning to FIG. 3, each floor plank 13 is provided with a web portion 22. When the floor panel is installed, the plurality of web portions are aligned flush such that a smooth surface floor is provided throughout the interior area of the railcar. The floor planks 13 also comprise side flanges 25, 26 and bottom flanges 28, 29. The side flanges 25, 26 have complementary curved shapes such that side flanges 25 and 26 on adjacent planks 13 nest together as shown. The side flanges 25 and 26 nest together yet leave sufficient space for a nailing groove 16 disposed between adjacent planks 13.

Figure 4:
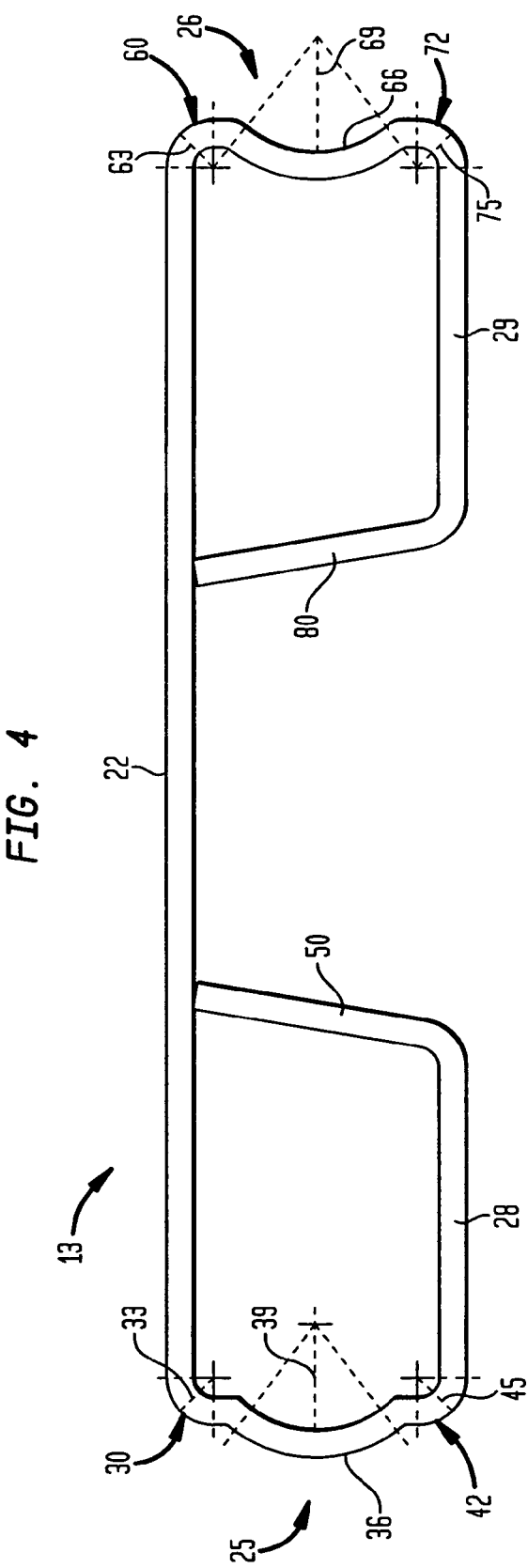
FIG. 4 is an end view of a single plank of the floor panel shown in FIG. 1.

In FIG. 4, an end view of a single plank 13 is shown. The plank 13 of the present invention may be formed integrally from a single piece of metal. For example, the plank 13 may be roll formed from a single sheet of steel. The web portion 22 extends to a pair of side flanges 25, 26 disposed on opposite sides of the web portion 22. With respect to the orientation of FIG. 4, side flanges 25 extend on the left hand side of the figure between the web portion 22 and the bottom flange 28. At the end of the web portion 22, the side flange 25 curves downward along a first arc 30 with a first radius 33. At the end of the first arc 30, the side flange 25 extends along a second arc 36 at a second radius 39. The second radius 39 may be longer than the first radius 33. At the end of the second arc 36, a third arc 42 extends at a third radius 45 to a point where it intersects the bottom flange 28. The third radius 45 may be equal to the first radius 33 described above. The three arcs 30, 36, and 42 combine to form a convex-shaped curved shape that is complementary to the shape of side flange 26.

Bottom flange 28 extends substantially parallel to web portion 22. At the end of the flange 28, a central portion 50 of the plank 13 curves upward underneath the web portion 22. At the end of the central portion 50, the plank 13 may be welded to the bottom surface 53 of the web portion 22.

On the right hand side of the figure, side flange 26 is formed by a first outwardly curving arc 60 having a first radius 63. The first arc 60 extends to an inwardly extending arc 66 having a second radius 69. The second radius 69 may be larger than the first radius 63. The inwardly extending arc 66 extends to a third outwardly extending arc 72 having a third radius 75. Third radius 75 may be equal to first radius 63.

At the end of the third arc 72, the bottom flange 29 extends substantially parallel to the web portion 22. The bottom flange 29 extends to an upward extending central portion 80 that is formed in the same manner as central portion 50 described above. The space between central portions 50, 80 forms a central opening 100.

The present invention provides a one-piece modular railcar nailable floor panel that provides support from a pair of integrally formed bottom panels. The invention provides several advantages including strength and ease of manufacture.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A plank for use in a nailable metal floor structure, the plank comprising:
   a web portion having a first end, a second end disposed opposite from the first end, a top surface and a bottom surface;
   a first side flange extending from the first end of the web portion and wherein the first side flange is convex;
   a second side flange extending from the second end of the web portion and wherein the second side flange is concave;
   a first bottom flange connected to the first side flange and extending substantially parallel to the web portion;
   a second bottom flange connected to the second side flange and extending substantially parallel to the web portion;
   a first central portion having an end extending from the first bottom flange to the bottom surface of the web portion such that the end contacts the bottom surface of the web and is welded to the bottom surface of the web;
   a second central portion having an end extending from the second bottom flange to the bottom surface of the web portion such that the end contacts the bottom surface of the web and is welded to the bottom surface of the web; and
   wherein the plank is formed from a one-piece construction.

2. The plank of claim 1, wherein the convex first side flange is formed from a plurality of arcuate sections.

3. The plank of claim 1, wherein the first side flange is formed from a first arc, a second arc, and a third arc, the first and second arcs having a first radius and the third arc having a second radius, the second radius being longer than the first radius.

4. The plank of claim 1, wherein the first side flange and the second side flange have complementary curved shapes such that adjacent planks are capable of nesting together and further wherein a nailing groove is defined between adjacent planks.

5. The plank of claim 4 further comprising a cement that is introduced into the nailing groove.

6. A nailable metal floor structure for mounting on the underframe of a freight vehicle, the structure comprising:
   a plurality of planks forming a planar floor surface inside the freight vehicle, the planks having a web portion with a planar top surface and a bottom surface, the web portion extending between a pair of side flanges, the side flanges having complementary curved shapes so that adjacent planks are capable of nesting, the side flanges extending to bottom flanges, the bottom flanges extending substantially parallel to the web portion and being separated by a central opening, the central opening formed between first and second angled central portions extending from the bottom flanges to the bottom surface of the web portion and wherein each of the first and second angled central portions has an end that contacts and is welded to the bottom surface of the web;
   wherein the planks are disposed in side by side generally parallel relation, each plank having the web portion forming the surface of the floor and having the side flanges depending from the opposite ends of the web portion so that adjacent flanges of contiguous planks are complemental to each other thereby providing nailing grooves between each adjacent pair of planks; and
   wherein the plurality of planks are each formed from a one-piece construction.

7. The plank of claim 6, wherein the first side flange is convex.

8. The plank of claim 7, wherein the second side flange is concave.

9. The plank of claim 6, wherein the first side flange is formed from a plurality of arcuate sections.

10. The plank of claim 6, wherein the first side flange is formed from a first arc, a second arc, and a third arc, the first and second arcs having a first radius and the third arc having a second radius, the second radius being longer than the first radius.

11. The plank of claim 6, wherein the first side flange and the second side flange have complementary curved shapes such that adjacent planks are capable of nesting together and further wherein a nailing groove is defined between adjacent planks and a cement is introduced into the nailing groove.

12. A plank for use in a nailable metal floor structure, the plank comprising:
   a web portion with a top surface, a bottom surface, a first end and a second end opposite the first end;
   a pair of side flanges extending from the first and second ends of the web portion respectively, the side flanges having complementary curved shapes;
   a pair of bottom flanges extending substantially parallel to the web portion and separated by a central opening;
   first and second central portions extending from the bottom flanges to the bottom surface of the web portion and wherein the first central portion has an end and the second central portion has an end and wherein the ends contact the bottom surface of the web portion and are each welded to the web portion; and
   wherein the plank is formed from a one-piece construction.

13. The plank of claim 12, wherein the first side flange is convex.

14. The plank of claim 13, wherein the second side flange is concave.

15. The plank of claim 12, wherein the first side flange is formed from a plurality of arcuate sections.

16. The plank of claim 12, wherein the first side flange is formed from a first arc, a second arc, and a third arc, the first and second arcs having a first radius and the third arc having a second radius, the second radius being longer than the first radius.

17. The plank of claim 12, wherein the first side flange and the second side flange have complementary curved shapes such that adjacent planks are capable of nesting together and further wherein a nailing groove is defined between adjacent planks.

18. The plank of claim 17 further comprising a cement that is introduced into the nailing groove.

* * * * *